United States Patent
Pearce et al.

(10) Patent No.: US 6,192,471 B1
(45) Date of Patent: *Feb. 20, 2001

(54) OPERATING SYSTEM INDEPENDENT SYSTEM FOR RUNNING UTILITY PROGRAMS IN A DEFINED ENVIRONMENT

(75) Inventors: John J. Pearce; Anthony L. Overfield, both of Austin, TX (US)

(73) Assignee: Dell USA, LP, Austin, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/592,504

(22) Filed: Jan. 26, 1996

(51) Int. Cl.$^7$ .................................................. G06F 9/00
(52) U.S. Cl. ...................................... 713/2; 710/200
(58) Field of Search ................................. 395/680, 681, 395/683, 682, 186; 709/300, 301, 303, 302, 100–108, 310–332; 710/200, 220, 240; 713/1, 2, 100

(56) References Cited

U.S. PATENT DOCUMENTS

| | | | |
|---|---|---|---|
| 5,128,995 | * 7/1992 | Arnold et al. | 395/500 |
| 5,131,089 | * 7/1992 | Cole | 395/500 |
| 5,153,577 | * 10/1992 | Mackey et al. | 395/680 |
| 5,371,871 | * 12/1994 | Spilo et al. | 395/425 |
| 5,754,821 | * 5/1998 | Cripe et al. | 395/185 |
| 5,842,011 | * 11/1998 | Basu | 713/2 |
| 5,901,312 | * 5/1999 | Radko | 709/104 |

* cited by examiner

*Primary Examiner*—St. John Courtenay, III
(74) *Attorney, Agent, or Firm*—Skjerven Morrill MacPherson LLP; Ken J. Koestner

(57) ABSTRACT

A system which builds an operating system-independent environment for executing utility programs is created by establishing a virtual drive that resides on a physical disk drive within the native file system of a native operating system. A virtual drive is a set of files on a physical disk drive that is configured to emulate a physical disk drive. The virtual drive can be deleted by a computer user and similarly can be re-established by the computer user. The virtual drive is bootable and activates an operating system that makes all system resources accessible to the utility programs and also allows the computer user to use the disk space that is allocated for the virtual drive, if desired.

35 Claims, 13 Drawing Sheets

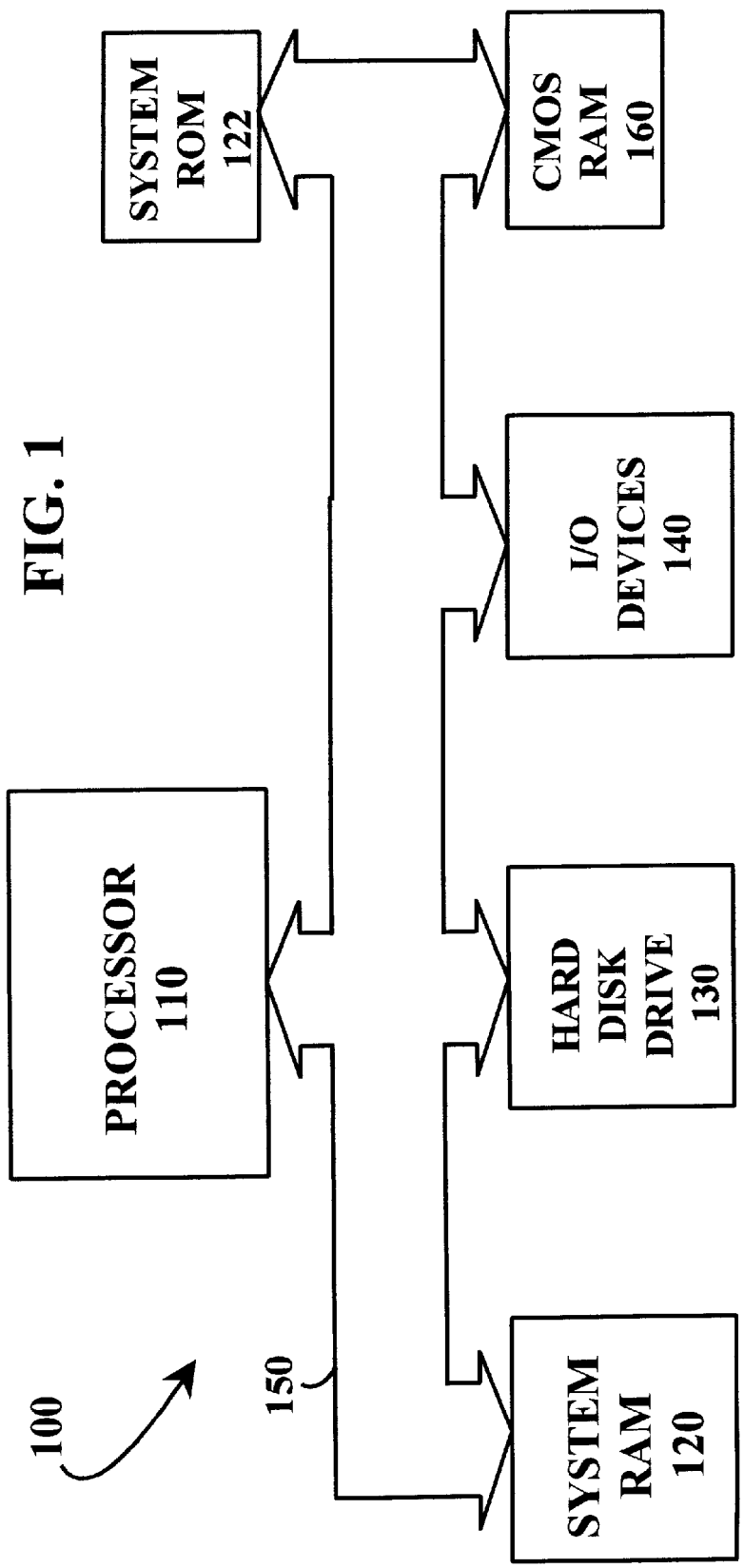

OPERATING SYSTEM INDEPENDENT SYSTEM FOR RUNNING UTILITY PROGRAMS IN A DEFINED ENVIRONMENT

FIELD OF INVENTION

This invention relates to computer system utility programs. More specifically, this invention relates to an apparatus and method for creating an operating environment for operating computer system utility programs.

BACKGROUND OF THE INVENTION

Various utility programs, for example some diagnostic utilities, are fully and correctly operable only when all aspects of the computing environment are known and all system resources are available without restriction. For example, a memory diagnostic utility typically tests memory by writing bit patterns to all or a substantial proportion of memory, reading back the written bit patterns and verifying that the bit patterns read are the same as the bit patterns that were written. However, a computer system typically operates under control of an operating system, a master set of programs which controls a computer system and, thus, restricts write access to various locations in memory.

An operating system which is activated by bootstrap loading from a disk drive may be called a native operating system. The file system of the master set of programs making up the native operating system may be called a native file system.

Operating systems, such as Windows™ and OS/2™, provide a known environment and make system resources available by establishing a virtual environment for running utilities. The virtual environment invoked is typically called a DOS box. Unfortunately, DOS boxes are a virtual environment and do not furnish a control environment for the physical computing environment. Rather than furnishing access to the entire physical system, an operating system often interprets or ignores various instructions that are executed by the utility.

One example of a limitation of DOS boxes arises in the Windows NT™ operating system. Windows™ traps input and output (I/O) operations. The Windows™ operating system also is known to restrict the I/O operations of utility programs.

Conventional methods for performing utility functions without interference from the operating system include bootstrap loading a special operating system that is established for the purpose of running utility functions. In other systems the operating system is established in conjunction with utility programs so that a utility is allowed access to particular system resources. A computer system manufacturer can address also some of these problems by creating a separate partition on the disk drive, loading the utilities onto the separate partition and encrypting the utility programs so that the utility programs cannot be executed by a casual user.

Another conventional technique for establishing a utility operating environment which avoids these restrictions involves creating a separate bootable partition on a disk drive and subdividing the disk drive storage area into smaller units allocated to specific tasks, including the utility operating environment tasks. However, this technique requires inflexible and constant reservation of portions of a user's physical disk drive.

Several problems arise from this unrelenting reservation of storage resources. First, if a computer user repartitions and reformats the storage system without properly re-establishing the utility environment, the utility programs cannot be reinstalled without unloading all data on the storage system and appropriately reestablishing the proper partitioning.

A second problem arises if a computer system user accidentally or inadvertently deletes the program files which make up the utilities. Files which make up the utility partition are typically large files with names that are obscure to the computer user. A computer user running low on storage resources may delete the large, space-consuming, obscurely-named utility files without understanding their importance. Restoring deleted utility files is difficult and expensive because the files often include multiple megabytes of information which must be written onto a transfer media such as multiple floppy disks. The transfer media and the time needed to write appropriate files to the media are expensive for a manufacturer providing the programmed media and for the computer user. Furthermore, the utility files are typically restored by transferring information on multiple floppy disks, perhaps a dozen disks, to a hard disk drive, a very time consuming task to the computer user.

A third problem is that the computer user cannot easily make use of the disk drive space used for the utility environment in an emergency situation.

What is needed is a technique for furnishing a known operating environment in which all resources of a computer system are fully accessible and the storage resources for implementing the operating environment can be removed and reinstalled easily upon user command.

SUMMARY OF THE INVENTION

In accordance with the present invention, a system which builds an operating system-independent environment for executing utility programs is created by establishing a virtual drive that resides on a physical disk drive within the native file system of a native operating system. A virtual drive is a set of files on a physical disk drive that is configured to emulate a physical disk drive. The virtual drive can be deleted by a computer user and similarly can be re-established by the computer user. The virtual drive is bootable and activates an operating system that makes all system resources accessible to the utility programs and also allows the computer user to use the disk space that is allocated for the virtual drive, if desired.

In accordance with one embodiment of the present invention, a method of executing a utility program on a computer system includes steps of reserving a region of a native file system for usage as a virtual disk drive and executing a virtual disk drive reboot command that designates the virtual disk drive as a bootstrap device. The reboot command invokes an interceptor in response to the reboot command. The interceptor relates a location on the virtual disk drive to a location in the native file system and intercepts disk accesses to the virtual disk drive, directing a disk access location to a native file system location.

In accordance with a second embodiment of the present invention, a method of executing a utility program on a computer system includes steps of reserving a region of a physical disk drive for usage as a virtual disk drive, bootstrap loading an operating system which designates the virtual disk drive as a bootstrap device and intercepting disk accesses to the virtual disk drive and thereby directing a disk access location to a corresponding physical disk drive location.

In accordance with a third embodiment of the present invention, a utility program operating on a computer system having a processor, a memory and a hard disk drive includes a virtual drive reservation routine which reserves a region of the hard disk drive as a virtual disk drive, an interceptor which intercepts a disk access directed to a location on the virtual disk drive and directs the disk access to a corresponding location on the physical disk drive and a reboot command which requests the virtual disk drive as a bootstrap device. A bootstrap routine responds to the reboot command by invoking the interceptor.

Many advantages are attained by the methods and programs discussed hereinabove. One advantage is that utility programs have access to all system resources without hindrance from an overlying native operating system. Another advantage is that the native operating system and the virtual drive are mutually independent and noninteracting so that performance of the active operating system is not influenced by the inactive operating system. A further advantage is that the virtual drive appears to a computer user simply as a single file. Multiple obscurely-named utility files are transparent to the user.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 1 is a block diagram which depicts computer system hardware upon which a system for implementing an operating system independent method for operating a utility program in accordance with the present invention.

DETAILED DESCRIPTION

Figure 2A:
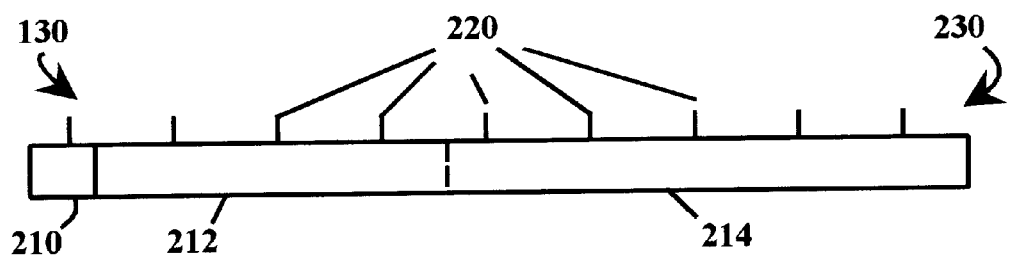
FIGS. 2A, 2B and 2C are block diagrams showing, respectively, formatting of a hard disk, a partition table entry and a hierarchy of pointers for an extended partition in the computer system shown in FIG. 1.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110.

FIG. 2A is a block diagram showing the format of the hard disk drive 130. Various aspects of the disk drive format are conventional and comply with operating standards in the computer industry. Other aspects of the disk drive format are modified from the standard format in accordance with the present invention. The hard disk drive 130 includes a partition sector 210 which is a standard structure in IBM compatible personal computers for defining partitions of a hard disk. The hard disk drive 130 also includes a native operating system partition 212, which includes a native file system which includes user data 214. Several cylinders 220 make up the hard disk drive 130. The physical embodiment of the hard disk drive 130 is referred to as a physical disk drive 230 hereinafter.

Figure 2B:
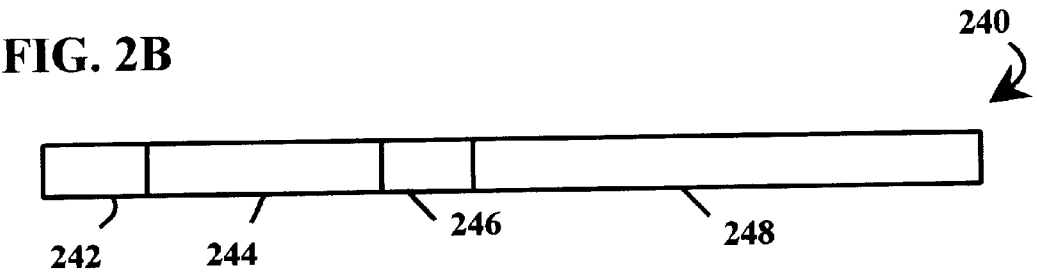

The partition sector 210 contains a partition table (not shown) which includes multiple table entries, each of which correspond to a partition of the hard disk drive 130. FIG. 2B illustrates a format of a partition table entry 240. A first field entry 242 of the partition table entry 240 designates whether the partition described by the partition table entry is a bootable partition. A second field 244 indicates the physical location of the beginning of the partition on the hard disk drive 130, addressed according to head, sector and cylinder. A third field 246 of the partition table entry 240 indicates the physical location of the end of the partition on the hard disk drive 130. A remaining field 248 contains additional information relating to the partition. Typically, the first entry in the partition table (entry 0) defines the native operating system partition 212.

Figure 2C:
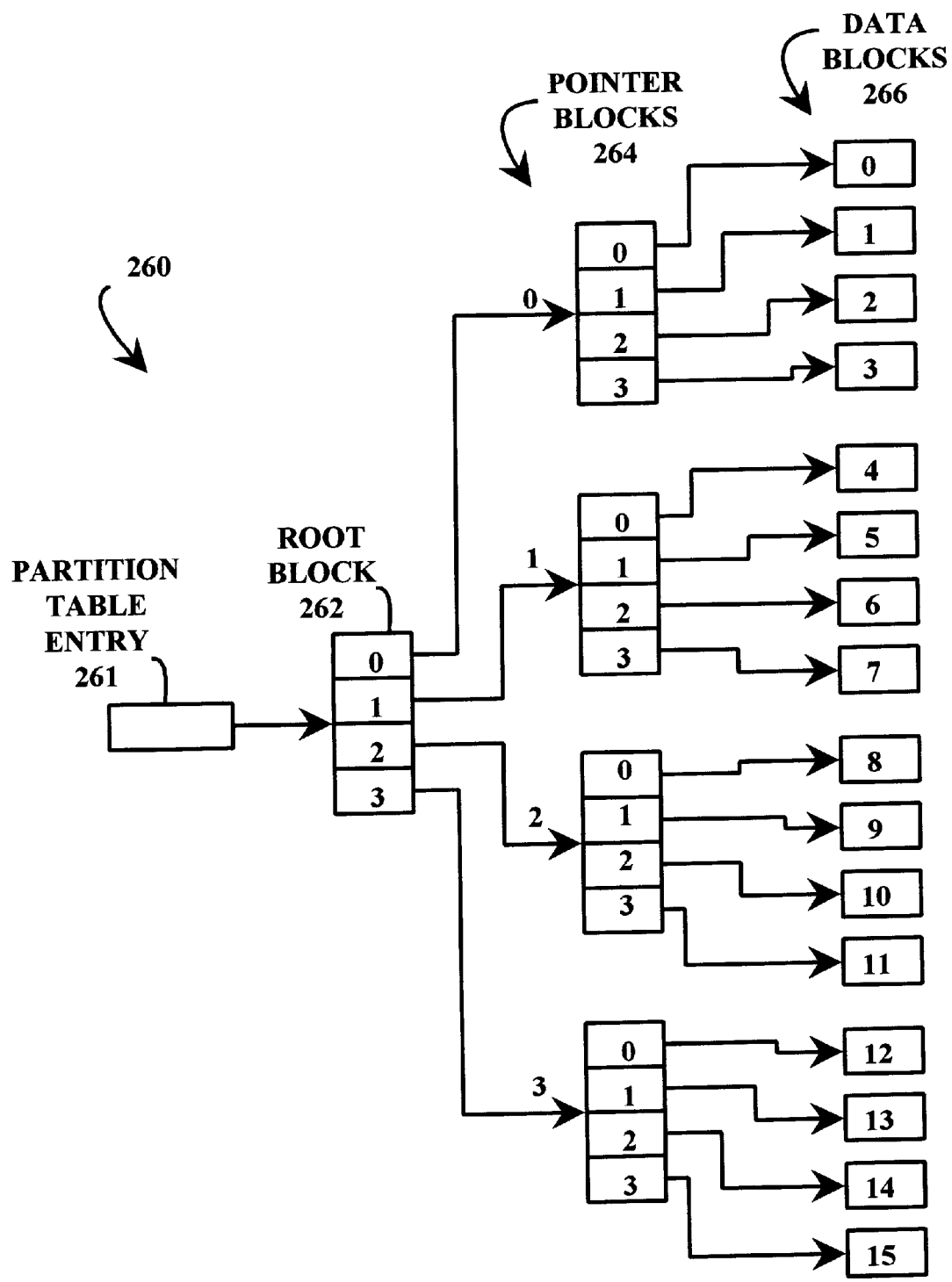

A virtual drive is configured as an extended partition of the hard disk drive 130. The extended partition is defined using a hierarchy of pointers to indicate locations of available data blocks in the user data area 214 of the hard disk drive 130 that are available for usage in the extended partition. FIG. 2C is a block diagram showing this hierarchy of pointers 260. A virtual drive partition table entry (entry 1) 261 points to a virtual drive partition 332 shown in FIG. 3B. The hierarchy of pointers 260 begins at the start of the virtual drive partition 332. Referring again to FIG. 2C, a root block 262—the beginning level of the hierarchy of pointers 260—is located at the beginning of the virtual partition 332. The root block 262 includes m entries number 0 through m−1. Each of the m entries point to one of m pointer blocks 264. Similarly, each of the m pointer blocks 264 points to one of n data blocks 266. The n data blocks are numbered 0 through n–1. The size of the root, pointer and data blocks directly depends on the size of the virtual partition to be created. In the embodiment illustrated in FIG. 2C, both parameters m and n are equal to four so that the total number of data blocks is sixteen.

Figure 3A:
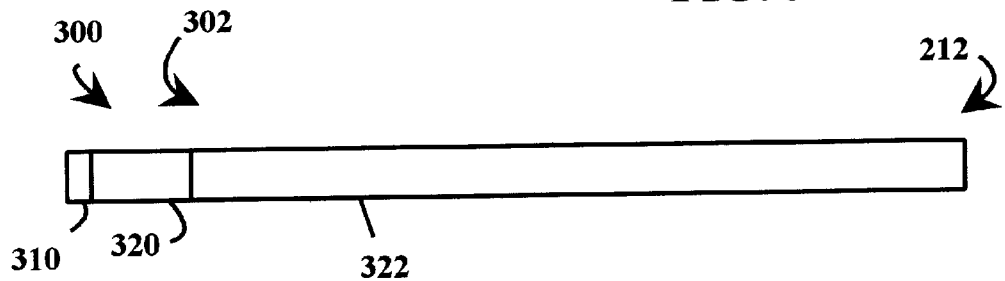
FIGS. 3A and 3B are block diagrams which show, respectively, a format of a native operating system on a hard disk drive and a format of a virtual drive on the hard disk drive within the native operating system.

A block diagram of a native file system 300 of a native operating system 302 on a physical disk drive 230 is depicted in FIG. 3A. The physical disk drive 230 includes multiple sectors including a partition sector 310 and a native operating system reserved area 320. The partition sector 310 typically occupies more than a single sector of the physical disk drive 230. The native operating system reserved area 320 is used for various purposes by the operating system. One purpose of the reserved area 320 is to indicate where various data is located on the physical disk. In the DOS operating system, the native operating system reserved area 320 is a file access table (FAT). In the Unix operating system, the native operating system reserved area 320 includes a root directory and allocation table. A user data area 322 follows the native operating system reserved area 320 for usage by a computer system user.

Figure 3B:
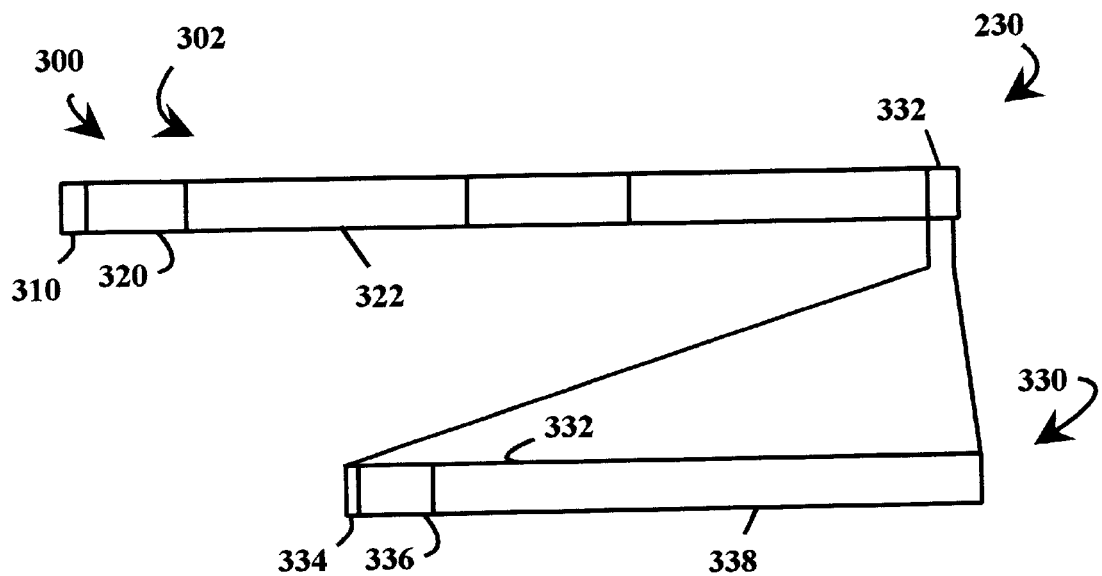

FIG. 3B shows a block diagram of a virtual drive 330 created in a virtual partition 332 that is defined within the user data area 322 of the native file system 300. The virtual drive 330 includes a virtual drive partition sector 334, a virtual drive operating system reserved area 336 and a virtual drive user data area 338. The virtual drive 330 forms a virtual system file 340 in the native file system 300.

Figure 4:
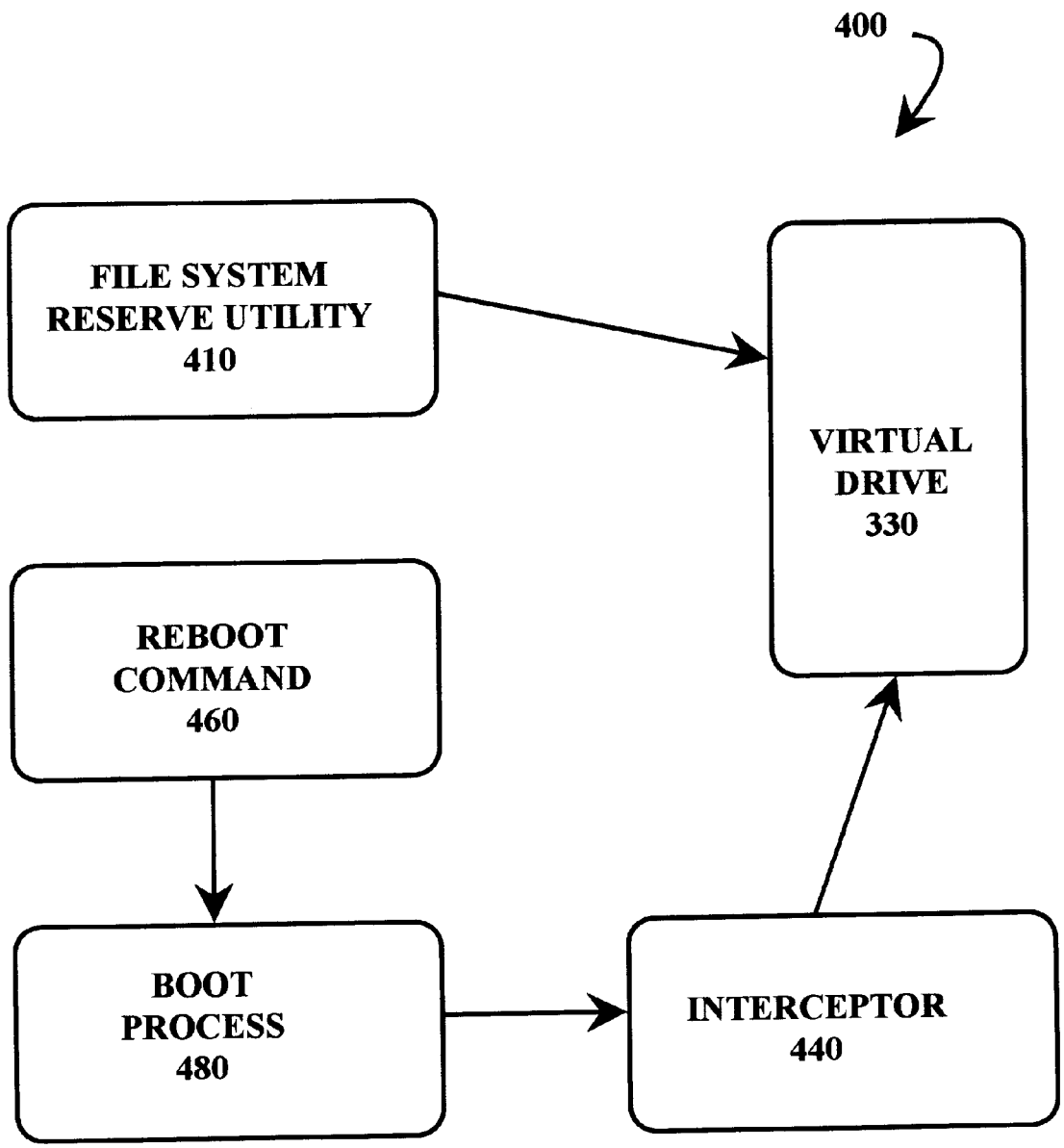
FIG. 4 is a block diagram which illustrates components of a system for creating an operating system independent environment for executing utility programs.

Referring to FIG. 4, a block diagram illustrates components of a system 400 for creating an operating system independent environment for executing utility programs. The system 400 includes a file system reserve utility 410, an interceptor 440, a reboot command 460 and a boot process 480. The file system reserve utility 410 reserves a region of a native file system 300 on a physical disk drive for usage as a virtual drive 330. The interceptor 440 intercepts disk accesses to the virtual drive 330 and directs the accesses to appropriate access locations of the physical disk drive. The reboot command 460 requests bootstrapping of the computer with the virtual drive 330 as the bootstrap device. The boot process 480 recognizes a request of the virtual drive reboot command 460 and, in response to the reboot command 460, invokes the interceptor 440.

The file system reserve utility 410 reserves a region of a native file system for usage as a virtual drive 330 by creating and writing a file to the native file system. In various embodiments, the file system reserve utility 410 writes a contiguous file to the native file system. In other embodiments, the file written to the native file system is a noncontiguous file.

In some embodiments of the system 400, a defragment program is run on the physical disk drive 230 prior to initiating the file system reserve utility 410 so that data is organized and compacted to one end of the disk, rather than scattered diffusely throughout the disk. Defragmenting the disk typically leaves a large contiguous portion of the disk unused and available for subsequent usage, including creation of the virtual drive file.

Figure 5:
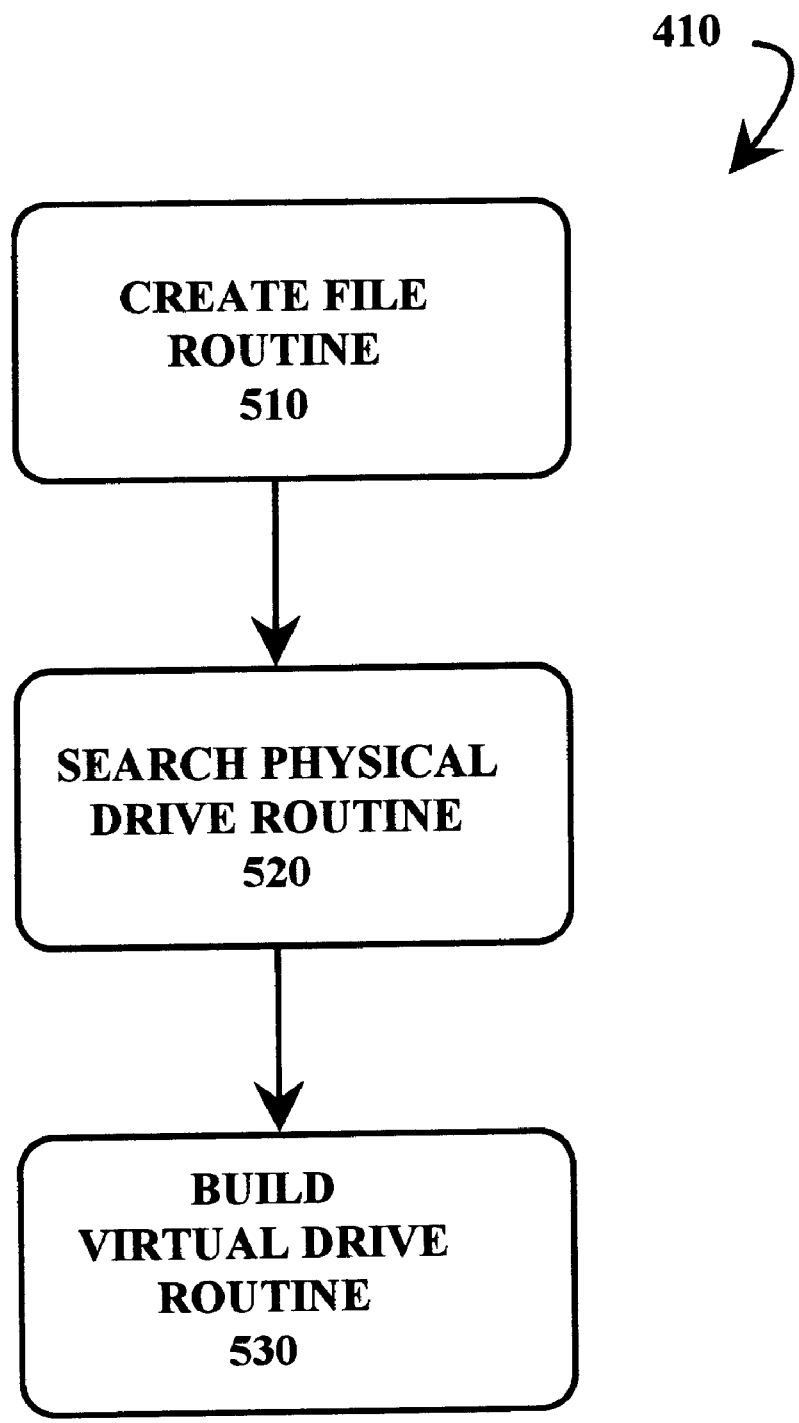
FIG. 5 is a flowchart showing steps of an embodiment of a file system reserve utility of the system shown in FIG. 4.

Referring to FIG. 5, a flowchart illustrates steps of an embodiment of the file system reserve utility 410. A create file routine 510 of the file system reserve utility 410 creates a file in a logical file system for usage in accessing files on the virtual drive. The create file routine 510 creates the file in an uncompressed portion of a native file system such as the native file system 300 shown in FIG. 3. Following performance of the defragment procedure, the native file system 300 includes a contiguous unused area. The create file routine 510 creates a virtual drive file which is placed the previously unused area. As a result of these operations, the native file system 300 includes the user data section 322 and a virtual system file 340. The disk is divided and organized in cylinders 220. The virtual system file 340 begins on a cylinder boundary to conserve space for storing recorded information. Note that the virtual system file 340 is written to an uncompressed portion of the physical disk drive 230. Various disk compression utilities are available that compress or otherwise change the form of information on the drive. These utilities include such routines as Doublespace, Drivespace or Stacker. The virtual drive is accessed by reading data that is real physical data, not compressed data. Therefore, the create file routine 510 is written to a region of the physical drive 230 that is not compressed or otherwise changed in form. A search physical drive routine 520 searches the physical disk drive 230 for sectors of the drive to be allocated to the virtual drive 330, thereby defining the position of the virtual drive with respect to the physical file system. For example, in some embodiments in which the native file system is a contiguous file system, the position of the virtual drive is set to begin at a cylinder number of the physical disk drive 230 and a cylinder offset is determined in the search physical drive routine 520 to relate locations on the virtual drive to corresponding locations on the physical drive. Thus, the search physical drive routine 520 searches to determine the location of the physical drive which corresponds to sector zero of the newly created virtual system file 340. This location, which is typically expressed as a disk cylinder number, is written to a storage location, such as a nonvolatile RAM or a storage location on the disk. For an embodiment of the system 400 in which the virtual system file 340 is a contiguous file, the information stored in nonvolatile RAM, such as a CMOS clock nonvolatile RAM 160, designates a pointer to the starting location of the virtual system file 340. Other virtual drive operational information is recorded on the virtual drive. In an illustrative example, a physical drive 230 has the form of an 800 megabyte hard disk drive. A ten megabyte virtual system is desired. The virtual drive may be implemented as a ten megabyte storage system which begins, for example, at cylinder number 300 of the hard disk drive. The search physical drive routine 520 sets the virtual drive cylinder offset to a value corresponding to a 300 megabyte offset to cylinder 300.

For an embodiment of the system 400 in which the virtual system file 340 is a noncontiguous file, the virtual system file created in create file routine 510 has file portions distributed across the disk drive. The search physical drive routine 520 searches the physical disk drive to find the starting physical sector, as is done for a contiguous virtual system file. However, the search physical drive routine 520 continues to search the physical disk drive to find all sectors of a noncontiguous file. For the noncontiguous file, all starting sectors of file portions and the corresponding number of sectors in each portion are determined and recorded.

For embodiments of the system 400 in which the native file system is a noncontiguous system, the search physical drive routine 520 searches the disk drive sector-by-sector, finding virtual sectors of the physical drive and recording information to allow subsequent navigation through the files.

A build virtual drive routine 530 builds the virtual drive with the sectors found in the search physical drive routine 520 by establishing a partition sector in the virtual drive, formatting the virtual drive then placing a directory structure on the virtual drive. Utility files that are selected for usage with the virtual drive are then copied to the virtual drive. Thus, the build virtual drive routine 530 partitions the virtual drive in a manner equivalent to the standard technique for partitioning a physical disk drive 230, thereby creating a virtual drive that operates within the native file system of the native operating system 302.

The physical disk drive 230 is physically formatted prior to any of the procedures for establishing the virtual drive. Thus, the virtual drive is logically formatted during the build virtual drive routine 530. Logical formatting is the operation of structuring and arranging files on the virtual drive and configuring of a root directory, allocation tables and other pointers used by an operating system to access the virtual drive.

The virtual drive file resulting from the build virtual drive routine 530 appears, when accessed via commands issued from the native operating system 302, as a single protected read-only file containing information that generally does not appear as traditional data. A directory listing listed from a native operating system 302 does not list the individual utility programs written into the virtual system file 340. These program files are not detectable through native operating system commands, but are listed when the virtual file system is bootstrap loaded.

Figure 6:
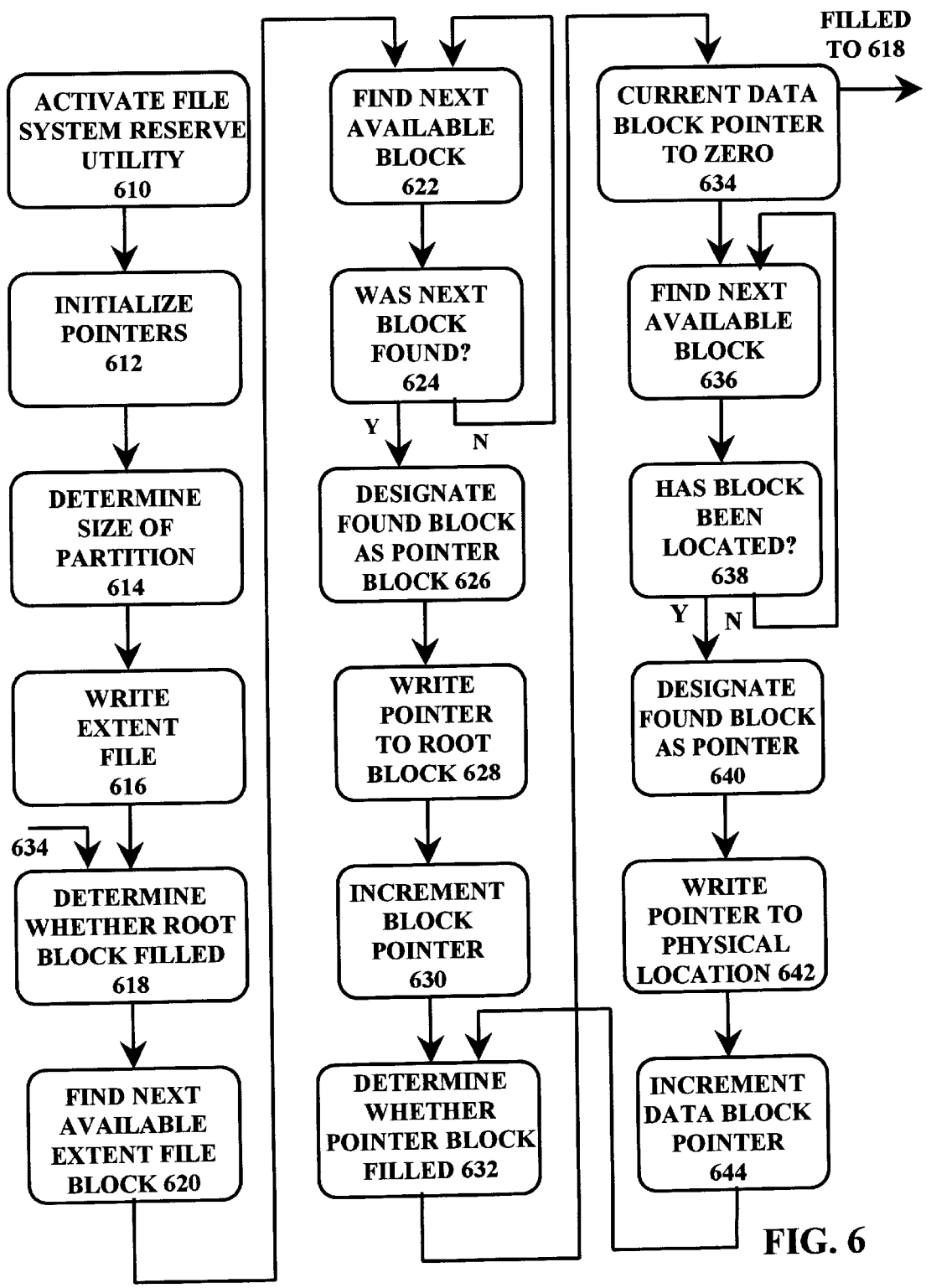
FIG. 6 is a flowchart depicting operation of a make partition utility of the file system reserve utility shown in FIG. 5.

In one embodiment of the utility environment creating system 400, the file system reserve utility 410 is implemented as a Make Partition utility. A flowchart of the operation of the make partition utility 600 is illustrated in FIG. 6. The make partition utility 600 creates an extended partition of a size appropriate to accommodate storage of the virtual drive partition 332 shown in FIG. 3B. Execution of the make partition utility 600 is initiated when a computer user activates the file system reserve utility 410 in step 610. In step 612, variables i and j, which respectively designate a current pointer block index and a current data block, are initialized to zero. In step 614, the size of the extended partition suitable to hold the virtual drive partition, the number of pointer blocks (m) 264 and the number of data blocks (n) 266 for each pointer block index 264 are determined. In step 616, the make partition utility uses the native operating system 302 to write an "extent" file, which subsequently becomes the virtual drive partition 332. The extent file may be configured as a contiguous file or a noncontiguous file in various embodiments of the system. Typically, the extent file includes disk space located within the user area alone.

In step 618, the value of the current pointer block index variable i is compared with the value stored in the pointer block index variable m to determine whether the root block 262 is completely filled. If the root block 262 is completely filled, control proceeds to step 620 in which execution of the make partition utility 600 is terminated. If the root block 262 is not completely filled, control proceeds to step 622, in which the physical disk drive 230 is read to find the next available block of the extent file written in step 616. Step 624 determines whether the next available block was found in step 622. If not, control returns to step 622 to continue searching for the next block. Otherwise, in step 626, the located block is designated as pointer block index i. In step 628, a pointer to the physical location of pointer block index i on the physical disk drive 230 is written to entry i of the root block 262 and, in step 630, variable i is incremented by 1.

Step 632 initializes the current data block variable j to zero. Step 634 determines whether pointer block index i is completely filled by comparing the value of the current data block variable j to the value stored in the pointer block index variable n. If so, step 634 directs the make partition utility 600 to return to step 618 to begin searching for the next pointer block index. If the pointer block index i is not completely filled, step 636 reads the physical disk drive 230 to find the next available block of the extent file. Step 638 determines whether a block has been located. If not, the next available block is sought in step 636. Otherwise, in step 640, the located block is designated as data block j. Step 642 then writes a pointer to the physical location of the data block j to entry j of pointer block index i. In step 644 variable j is incremented by 1 and the procedure returns to step 634. In this manner, the root block 262 and pointer blocks 264 are appropriately filled with pointers to the locations of the pointer blocks 246 and the data blocks 266, respectively, on the physical disk drive 230.

The interceptor 440 intercepts disk input and output requests to the virtual drive and redirects the request to an appropriate location on the physical drive 230. In some operating systems, a Basic Input/Output System (BIOS) is incorporated to customize input and output operations to a particular computer hardware. In some embodiments of the interceptor 440, the BIOS is modified or otherwise utilized to perform the interceptor function.

In a one embodiment, the interceptor 440 is implemented in a more complex form as a virtualized input/output (I/O) device. In the virtualized I/O device embodiment, the boot process 480 sets a flag that indicates that the computer system is operating in the virtual drive mode. A virtualized input/output interceptor 440 is implemented as a modified BIOS routine. For an input or output request, the modified BIOS routine checks whether the computer system is operating in the virtual drive mode. If so, the modified BIOS routine adds an offset to the disk drive cylinder number of the physical drive 230 so that all input and output operations are redirected to the portion of the physical drive that corresponds to the virtual drive. Thus, when the virtual drive is bootstrap loaded, any disk I/O is restricted to the virtual drive area. In a contiguous file embodiment of the system 400, the disk drive cylinder number is incremented by the cylinder offset determined in the search physical drive routine 520. In a noncontiguous embodiment of the system 400, some technique for tracking disk sectors is employed. For example, one noncontiguous implementation utilizes a sector table written to the hard disk drive to track sequencing from one sector to the next. In another example, the hierarchy of pointers tracks sequencing from one sector to the next.

Figure 7:
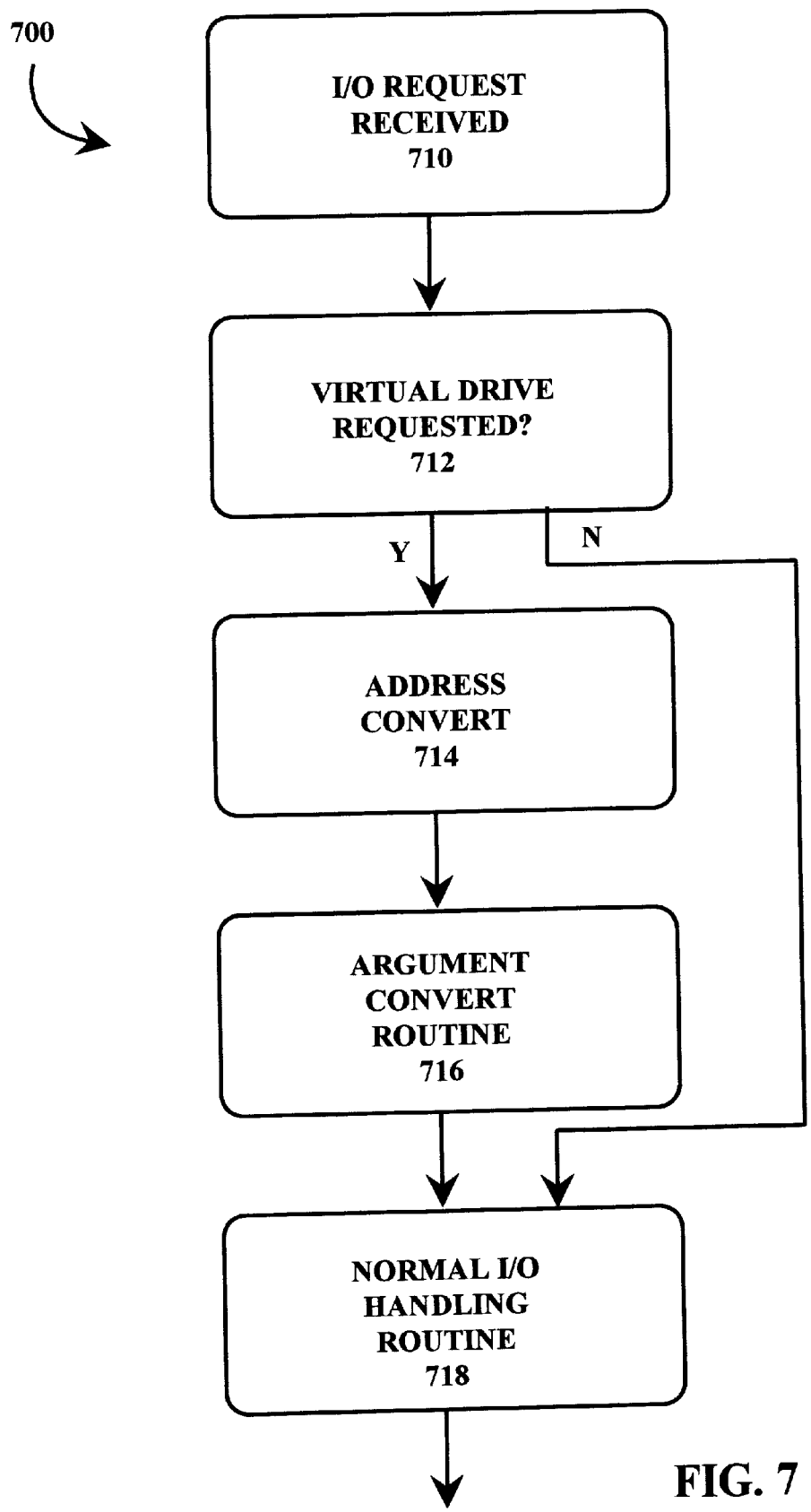
FIG. 7 is a flowchart showing steps of an embodiment of an interceptor, specifically a virtualized input/output interceptor, in the system for creating an operating system independent environment.

Referring to FIG. 7, a flowchart shows steps of an embodiment of a virtualized input/output interceptor 700 for intercepting disk input and output accesses and altering the accesses to appropriately address the physical drive in accordance with a specified access of the virtual drive. First, a disk I/O operation request, either a physical or virtual drive I/O request, is made in I/O request received step 710. Virtual drive logic step 712, determines whether the I/O request is a requested access of the virtual drive or an other access. If the I/O request addresses the virtual drive, address convert routine 714 converts the virtual disk address to a physical drive disk address. This address is converted, in the virtualized I/O interceptor embodiment, by reading the cylinder offset found by the search physical drive routine S20 from the CMOS clock nonvolatile RAM 160 and adding this offset to the disk drive cylinder number. Argument convert routine 716 changes the arguments passed in the virtual drive I/O request to suitable arguments on the physical drive 230. Normal disk I/O processing is executed in Normal I/O handling routine 718. For a disk I/O request that is not a virtual drive I/O request, virtual drive logic step 712 steers program control directly to the Normal I/O handling routine 718.

Figure 8:
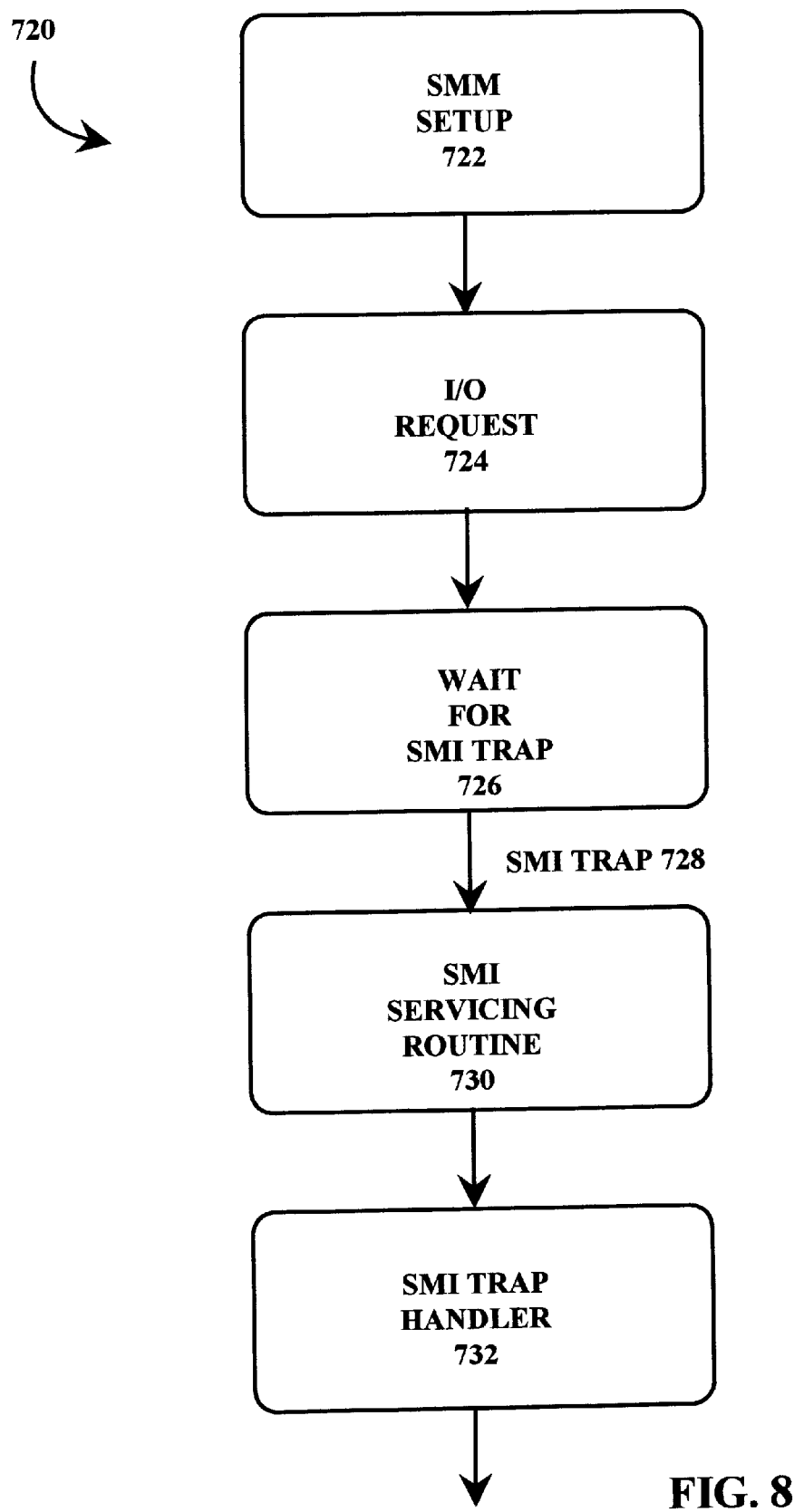
FIG. 8 is a flowchart showing steps of an embodiment of a second interceptor, specifically a system management mode (SMM) interceptor, in the system for creating an operating system independent environment.

In a second embodiment, a SMM interceptor 720 is implemented in system management mode (SMM) in conjunction with a system management interrupt (SMI). Referring to FIG. 8, a flowchart shows steps of an embodiment of a SMM interceptor 720 for intercepting disk input and output accesses and directing access to address the physical drive 230 in accordance with a specified access of the virtual drive. In SMM setup step 722, entry into the SMM is controlled so that the interrupt (SMI) is generated in response to an I/O request directed to a particular range of I/O addresses. An I/O calling program that controls disk I/O operations determines all of the parameters to be applied to a hardware disk controller to control the I/O functions. After all of the parameters are determined, in I/O request step 724 the I/O calling program issues a disk I/O command by writing the command to the hardware disk controller. After the disk I/O command is written, in wait step 726 the I/O calling program operation is suspended awaiting an SMI trap event. When the SMI trap event 728 occurs, the processor saves the current register state to system management RAM (SMRAM) space and begins to execute the SMM andler. A SMI servicing routine 730 reads from the hardware disk controller all of the parameters resulting from disk I/O operations. In the SMI embodiment, virtual disk addresses are related to physical disk addresses in the same manner as the virtualized I/O and TSR program embodiments, by determining and applying a disk drive offset value. The SMI trap handler 732 redirects a virtual drive I/O request to the proper location of the physical drive 230, starts the virtual drive and then exits out of the system management mode with the RSM (return from system management mode) instruction, allowing the virtual I/O operations to continue.

Figure 9:
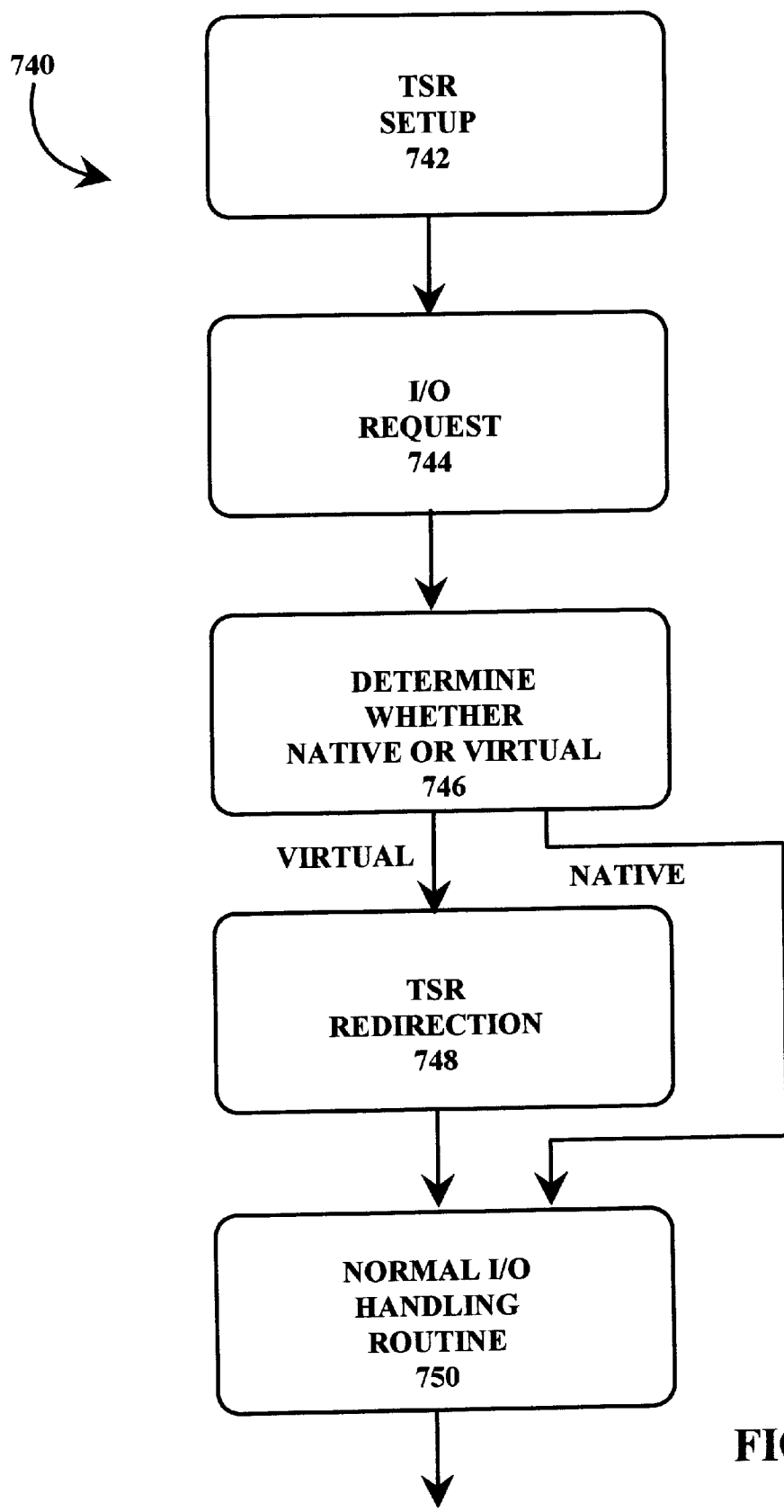
FIG. 9 is a flowchart showing steps of an embodiment of a third interceptor, specifically a terminate and stay ready (TSR) interceptor, in the system for creating an operating system independent environment.

In a third embodiment of the utility environment creating system 400, the TSR interceptor 740 is implemented as a Terminate and Stay Ready (TSR) program. Referring to the flowchart shown in FIG. 9 illustrating a TSR program embodiment, TSR setup step 742 which is activated as part of the boot process 480, loads a TSR program from disk that is interposed between the BIOS and the user program which makes an VO request addressing either the virtual drive or the physical drive 230. The TSR program receives the I/O request in step 744 and determines the appropriate destination, the virtual drive or the physical drive, to ultimately receive the request in step 746. If the virtual drive is the appropriate destination, a TSR redirection step 748 applies an offset to the virtual drive address to appropriately address the physical drive 230. Once the I/O request is redirected, normal I/O handling is performed in step 750. Otherwise, step 746 steers program control directly to the normal I/O handling routine 750.

An interceptor 440, such as an interceptor selected from the virtualized I/O, SMM and TSR interceptors, is activated using the reboot command 460. In typical embodiments, the reboot command 460 request is issued in the form of a standard command, written to a computer system console. In other embodiments, the reboot command 460 implemented in various other forms. For example, a form of "hot key" is defined in some embodiments to actuate a virtual system reboot operation. In other embodiments, two mouse keys are depressed simultaneously to actuate the reboot command and to identify the virtual drive as the bootstrap target.

Figure 10:
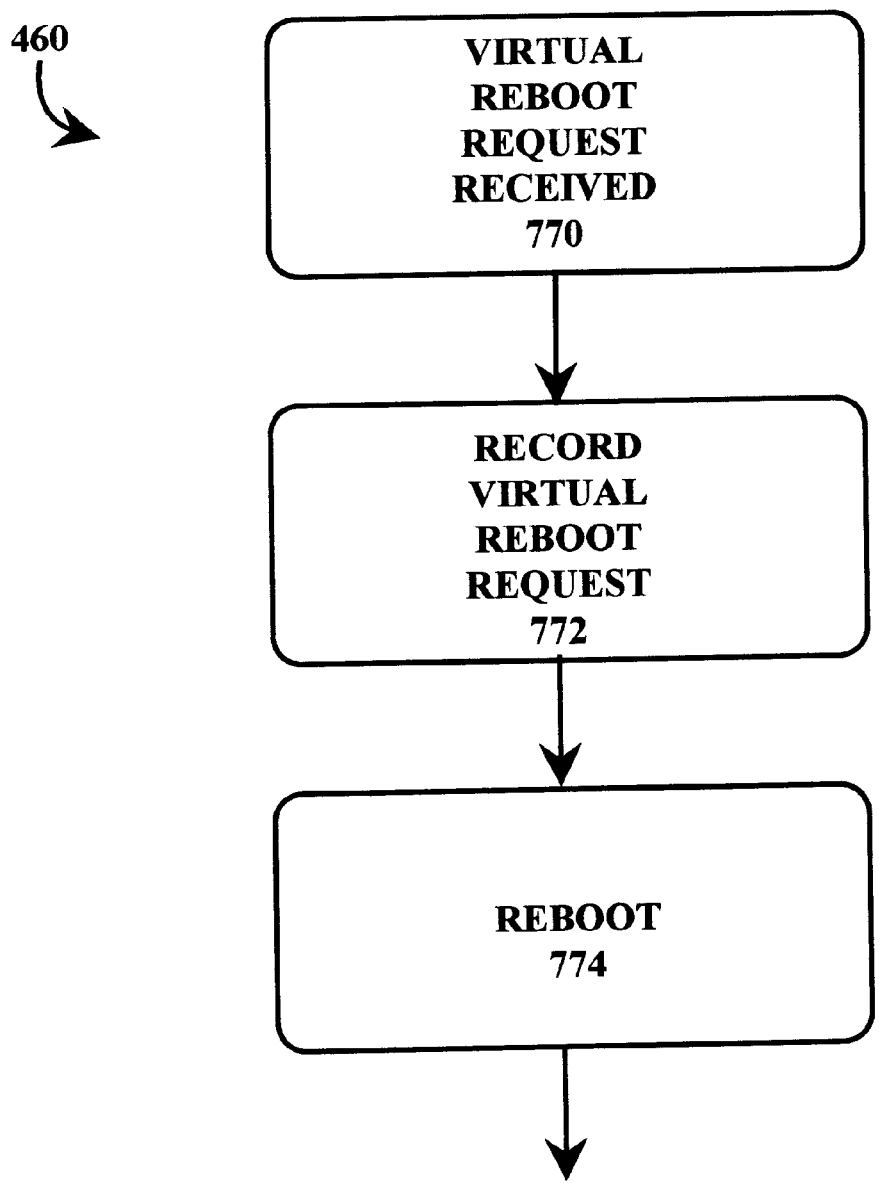
FIG. 10 is a flowchart which depicts steps of an embodiment of a reboot command, a utility program that initiates a rebootstrap operation that activates the virtual drive as the bootstrap device.

The reboot command 460 allows the computer system to convert from operating under control of the native operating system 302 to operating under control of the utility system operating from the virtual drive. The reboot command 460 sets a flag in nonvolatile RAM, installs an interceptor 440 and initiates the boot process 480. Generally, installation of the interceptor 440 invokes a redirection or jump instruction that alters disk input/output operations in some manner. In particular embodiments described herein, installation of the interceptor 440 is achieved by installing one of the TSR, SMI and virtualized I/O interceptors. In one embodiment of the utility environment creating system 400, the reboot command 460 is implemented as a utility program that calls an XBIOS function. The XBIOS function records a code in a CMOS clock nonvolatile RAM 160, shown in FIG. 1, and executes a standard bootstrap operation. The code designates that the utility environment has been invoked. Referring to FIG. 10, a flowchart depicts steps of an embodiment of the reboot command 460, a utility program that initiates a rebootstrap operation that activates the virtual drive as the bootstrap device. First, a reboot operation request directed to the virtual drive is received in reboot request received step 770. Record reboot request 772 then records the reboot request directed to the virtual drive in a nonvolatile memory such as the CMOS clock nonvolatile RAM 160. In system reboot step 774, the system is rebootstrapped.

Figure 11:
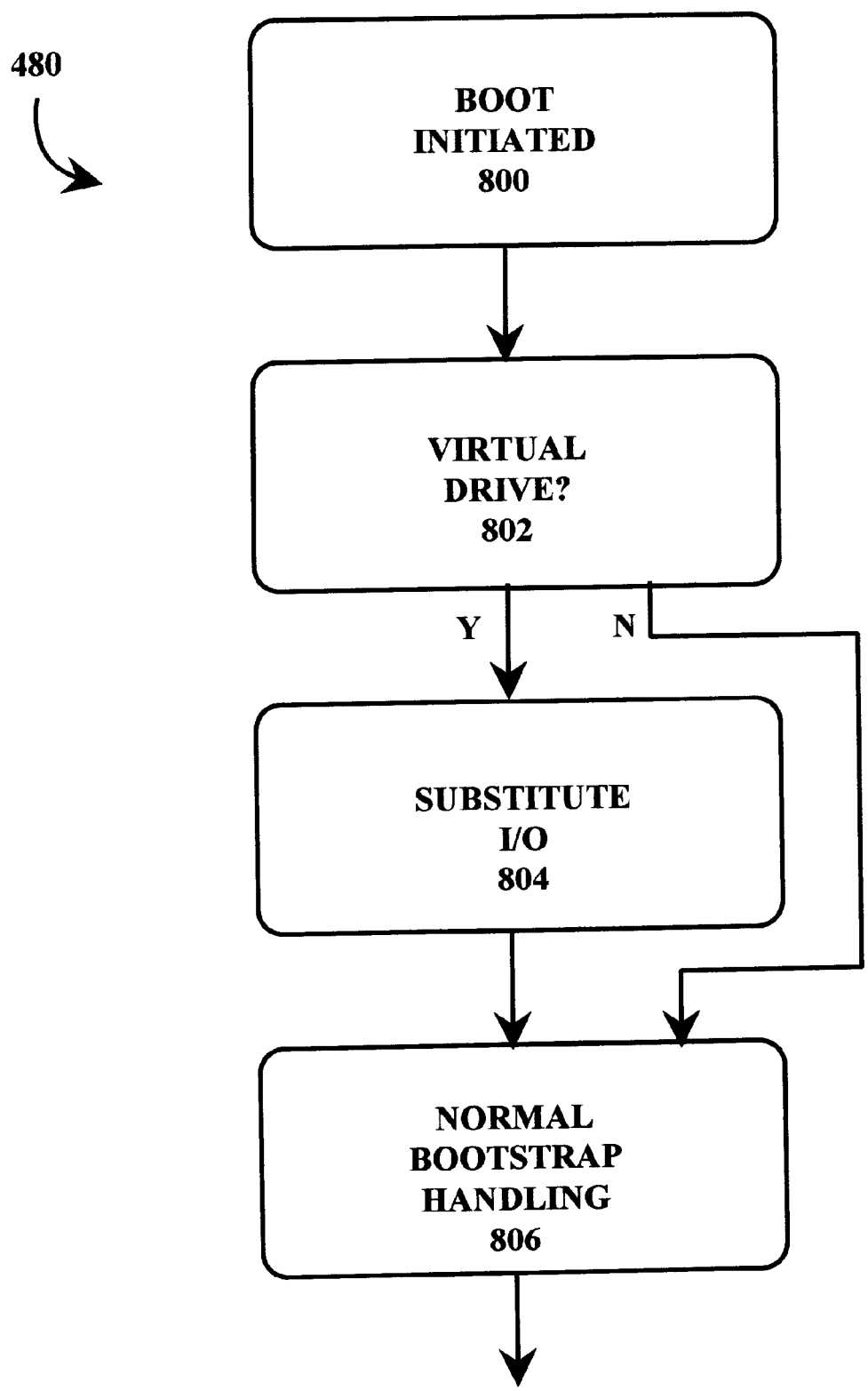
FIG. 11 is a flowchart illustrating steps of an embodiment of a boot process which recognizes a request for the virtual drive.

Referring to FIG. 11, a flowchart illustrates steps of an embodiment of the boot process 480 which recognizes a request for the virtual drive. First, the boot process 480 is activated by invocation of the reboot command 460 in boot initiated step 800. Reboot to virtual drive logic step 802, determines whether the reboot request is a requested reboot operation which is directed to the virtual drive or whether the reboot command is addressed to another device. If the reboot request is directed to the virtual drive, substitute I/O routine 804 substitutes the modified disk I/O function which directs I/O to the virtual disk drive. Normal bootstrap processing is executed in Normal bootstrap handling routine 806. For a reboot request that is not a virtual drive reboot request, reboot to virtual drive logic step 802 guides program control directly to the Normal bootstrap handling routine 806.

In different embodiments of the system 400 for creating an operating system independent environment, different techniques are employed for directing virtual disk I/O to corresponding physical drive locations. These techniques include the aforementioned TSR, SMI and virtualized I/O techniques.

Once the system 400 for creating an operating system independent environment is bootstrap loaded, the virtual drive emulates a physical drive that is loaded with only selected utilities and/or diagnostic functions. These utilities may include, for example, diagnostic test programs, user help files, hardware-specific interface drivers, and many other types of special-purpose information that is utilized in a system having access to all hardware resources in a computer system.

Figure 12:
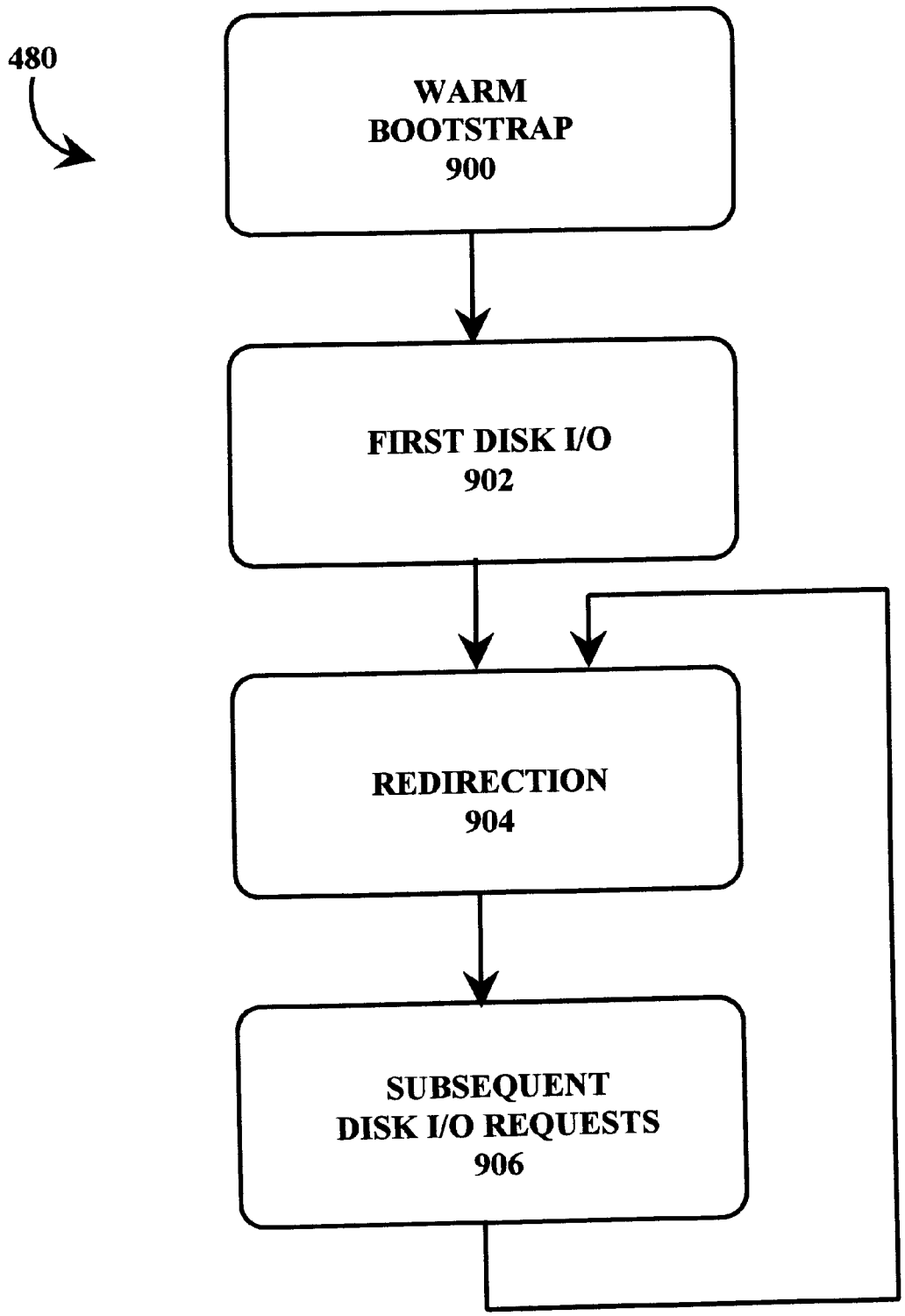
FIG. 12 is a flowchart depicting steps of an embodiment of a boot process which reboots a computer system using a warm bootstrap operation.

Referring to FIG. 12, the boot process 480 reboots the computer system using a warm bootstrap operation 900, a partial restart of an operating system under operating system control. A cold bootstrap operation, in contrast, refers to a complete restart of the computer system, resetting the entire state of the computer, such as occurs when system power is connected. On a warm bootstrap, various information are left unchanged in the memory for subsequent reference. Thus, for the warm bootstrap operation, the hardware disk controller is initialized in accordance with standard operations. However, when the computer system attempts to perform a first disk I/O operation 902 following the warm bootstrap, the interceptor 440 detects that the disk I/O is performed in the virtual drive mode so that the disk I/O is redirected using a method such as the TSR, SMI or virtualized I/O redirection techniques in redirection step 904. Once the virtual drive mode is activated in this manner, subsequent disk I/O requests 906 perform only virtual drive I/O functions. Once the redirection process is installed, the operating system activated by the warm bootstrap operation continues as a controlling operating system. In the standard warm bootstrap operation, after the first disk I/O operation takes place, which activates the virtual disk mode, the bootstrap operation reads cylinder zero, sector 1, head 0 of the virtual drive and accesses what is called the partition sector 310 shown in FIG. 3A. Thus the virtual disk mode partition sector 334 is accessed precisely in the same manner as the partition sector 310 is accessed for the native operating system 302 except that cylinder 0, sector 1 and head 0 of the virtual drive, which is located at some selected arbitrary location of the physical drive 230, is accessed, rather than the absolute cylinder 0, sector 1 and head 0 of the physical disk drive. Accordingly, the computer system proceeds to operate as though the entire physical disk drive were accessible even though only the limited virtual drive is actually accessed.

While the virtual drive operating system is active, the physical drive 230 becomes inaccessible to the computer user. Physical disk drive files are no longer listed in response to a directory display command, native operating system 302 functions and operations are terminated, and execution files on the native disk drive cannot be run. In essence, the physical drive 230 logically disappears. Thus, the virtual disk drive appears to the native operating system 302 as a single, large embedded file that is essentially inaccessible except by reboot command. Conversely, the physical disk drive is undetectable to an operating system bootstrap loaded from the virtual disk drive.

Subsequent warm bootstrap commands simply restart the virtual drive operating system. However, a cold bootstrap request 908 resets the entire computer system and bootstrap loads the native operating system 302 from the physical drive 230.

While the invention has been described with reference to various embodiments, it will be understood that these embodiments are illustrative and that the scope of the invention is not limited to them. Many variations, modifications, additions and improvements of the embodiments described are possible. The system for creating an operating system independent environment for executing utility programs disclosed herein may be used for many various purposes and implemented in multiple configurations. In an example that is illustrative of the application of the system, a hard disk drive diagnostic utility, which is operable under the DOS operating system, is loaded onto the virtual drive. Accordingly, DOS is installed as the operating system in a partition of the virtual drive as a part of the physical drive. However, the computer user normally uses the windows™ or OS/2 operating system as the native operating system and accordingly has windows™ or OS/2 installed to oversee the entire physical disk drive. when the native operating system is loaded, the DOS operating system on the virtual drive section of the physical drive is inactive. In this case, DOS operating system files act as dormant data files on the physical drive. When the DOS operating system is bootstrap loaded, the virtual drive is in control of the computer system and the main portion of the physical disk, including all files other than the virtual partition files, are ignored.

What is claimed is:

1. A method of executing a utility program on a computer system comprising:

operating in a computing environment that restricts access to a resource;

receiving a request to perform a utility program that attempts to access the resource in a manner that violates the access restriction;

in response to the request, executing the requested utility program bypassing the restrictions imposed by the computing environment independent of the particular computing environment including:

reserving a region of a native file system for usage as a virtual resource;

executing a virtual resource reboot command that designates the virtual resource in the reserved region of the native file system as a bootstrap device;

invoking an interceptor in response to the reboot command, the interceptor relating a location on the virtual resource to a location in the native file system;

executing the utility program, the utility program generating accesses to the virtual resource; and intercepting accesses to the virtual resource and directing a resource access location to a native file system location so that the resource subject to the access restriction is accessed despite the access restrictions imposed by the computing environment.

2. A method according to claim 1 wherein:

the reserved region of the native file system is a contiguous region.

3. A method according to claim 1 wherein:

the reserved region of the native file system is a non-contiguous region.

4. A method according to claim 1 wherein the reserving act includes:

writing a contiguous file to the native operating system.

5. A method according to claim 1 wherein the reserving act includes:

writing a non-contiguous file to the native operating system.

6. A method according to claim 1 wherein the region reserving act further includes:

creating a logical file system in a native file system on a physical resource for usage as a virtual;

finding a location of the logical file system on the physical resource;

installing a partition sector in the logical file system;

formatting the logical file system; and copying selected utilities into the partitioned and formatted logical file system.

7. A method according to claim 1 wherein the region reserving act further includes:

creating a file in a logical file system which defines record formats within a physical file system;

searching the physical file system for locations of the logical file system; and recording a record sector number, a record cylinder number and a location of a next record of a location of a non-contiguous region.

8. A method according to claim 1 wherein:

the resource accesses are intercepted by incrementing a cylinder of the physical resource by a preselected cylinder offset.

9. A method according to claim 1 wherein:
the resource accesses are intercepted using a Terminate and Stay Ready (TSR) program including:
loading a TSR program from the physical resource so that the TSR program is interposed between a BIOS operating system and a program calling the resource accesses; and
operable by the TSR program, determining a position in the physical resource for accessing a data location in the virtual resource.

10. A method according to claim 1 wherein:
the resource accesses are intercepted in a System Management Mode (SMM) using a System Management Interrupt (SMI) including:
setting up parameters for performing resource accesses in a resource controller;
commanding the resource controller to initiate the resource access;
trapping a resource access with an SMI;
responsive to the SMI, accessing the parameters from the resource controller; and
converting a physical resource address to a virtual resource address using the accessed parameters.

11. A method according to claim 1 wherein the reboot command executing act further includes:
setting a flag in a non-volatile memory activating resource accesses to the virtual resource;
bootstrapping the computer system including initializing a disk controller; and
conditioning the interceptor to intercept the disk accesses.

12. A method according to claim 1 wherein the reboot command executing act further includes:
entering a reboot command; and
executing an entered reboot command including:
initializing computer system hardware;
determining whether a reboot operating system is operating from the virtual resource; and
activating the interceptor.

13. A computer program product comprising:
a computer usable medium having computable readable code embodied therein implementing the method according to claim 1.

14. A computer system comprising:
a processor;
a memory coupled to the processor, the memory including a computable readable code embodied therein implementing the method according to claim 1.

15. A method according to claim 7 further comprising:
installing a partition sector in the logical file system;
formating the logical file system; and
copying selected utilities into the partitioned and formatted virtual resource.

16. A method according to claim 11 wherein the bootstrapping act is a warm and/or cold bootstrapping act further including:
depressing two mouse buttons simultaneously during the bootstrap operation; and
executing an entered reboot command including:
initializing computer system hardware;
determining whether a reboot operating system is operating from the virtual resource; and
activating the interceptor.

17. A method of executing a utility program on a computer system comprising:
operating in a computing environment that restricts access to a resource;
receiving a request to perform a utility program that attempts to access the resource in a manner that violates the access restriction;
in response to the request, executing the requested utility program bypassing the restrictions imposed by the computing environment independent of the particular computing environment including:
reserving a region of a physical resource for usage as a virtual resource;
bootstrap loading an operating system which designates the virtual resource in the reserved region of the native file system as a bootstrap device;
executing the utility program, the utility program generating resource accesses to the virtual resource; and
intercepting the resource accesses to the virtual resource and directing a resource access location to a corresponding physical resource location so that the restricted-access resource subject to the access restriction is accessed despite the access restrictions imposed on the resource by the computing environment.

18. A method according to claim 17 wherein the region reserving act further includes:
creating a logical file system in a native file system on a physical resource for usage as a virtual resource;
finding a location of the logical file system on the physical resource;
installing a partition sector in the logical file system;
formatting the logical file system; and
copying selected utilities into the partitioned and formatted logical file system.

19. A method according to claim 17 wherein the act of reserving the region further includes:
creating a logical file system which defines record formats on the physical resource;
searching the physical resource for locations of the logical file system; and
recording a record sector number and a location of a next record of a location of a non-contiguous region of the physical resource.

20. A method according to claim 17 wherein:
the intercepting act intercepts resource accesses by incrementing a cylinder of the physical resource by a preselected cylinder offset.

21. A method according to claim 17 wherein:
the intercepting act intercepts resource accesses using a Terminate and Stay Ready (TSR) program including:
loading a TSR program from the physical resource so that the TSR program is interposed between a BIOS operating system and a program calling the resource accesses; and
operable by the TSR program, determining a position in the physical resource for accessing a data location in the virtual resource.

22. A method according to claim 17 wherein:
the intercepting act intercepts resource accesses in a System Management Mode (SMM) using a System Management Interrupt (SMI) including:
setting up parameters for performing resource accesses in a resource controller;
commanding the resource controller to initiate the resource access;
trapping a resource access with an SMI;

responsive to the SMI, accessing the parameters from the resource controller; and converting a physical resource address to a virtual resource address using the accessed parameters.

23. A computer program product comprising:

a computer usable medium having computable readable code embodied therein implementing the method according to claim 17.

24. A computer system comprising:

a processor;

a memory coupled to the processor, the memory including a computable readable code embodied therein implementing the method according to claim 17.

25. A method according to claim 19 further comprising:

installing a partition sector in the logical file system;

formatting the logical file system; and copying selected utilities into the partitioned and formatted virtual resource.

26. A computer usable medium having computable readable code embodied therein for operating on a computer system having a processor, a memory and a hard disk drive, the computable readable code comprising:

a utility activation routine operational in a computing environment that restricts access to a resource, the utility activation routine being invoked by a request to perform a utility program that attempts to access the resource in a manner that violates the access restriction; and an operating system independent utility execution routine that executes the requested utility program bypassing the restrictions imposed by the computing environment independent of the particular computing environment, the operating system independent utility execution routine including:

a virtual drive reservation routine responsive to the utility activation routine, the virtual drive reservation routine reserving a region of the hard disk drive as a virtual disk drive;

an interceptor which intercepts a disk access directed to a location on the virtual disk drive in the reserved region of the native file system and directs the disk access to a corresponding location on the physical disk drive;

a reboot command that activates the virtual disk drive as a bootstrap device; and a bootstrap routine responsive to the reboot command by invoking the interceptor;

a utility routine operational to generate disk accesses to the virtual disk drive so that the resource subject to the access restriction is accessed despite the access restrictions to the resource imposed by the computing environment.

27. A computer usable medium having computable readable code embodied therein for operating on a computer system having a processor, a memory and a hard disk drive, the computable readable code comprising:

means for operating in a computing environment that restricts access to a resource; and means for executing the requested utility program bypassing the restrictions imposed by the computing environment independent of the particular computing environment including:

means for receiving a request to perform a utility program that attempts to access the resource in a manner that violates the access restriction;

means responsive to receipt of a request for reserving a region of the hard disk drive as a virtual disk drive;

means for intercepting a disk access directed to a location on the virtual disk drive in the reserved region of the native file system and directing the disk access to a corresponding location on the physical disk drive;

means for requesting the virtual disk drive as a bootstrap device;

means for executing the utility program, the utility program generating disk accesses to the virtual disk drive; and means responsive to the requesting means for invoking the intercepting means to intercept disk accesses to the virtual disk drive and direct a disk access location to a native file system location so that the resource subject to the access restriction is accessed despite the access restrictions imposed by the computing environment.

28. A computer usable medium having computable readable code embodied therein for operating on a computer system having a processor, a memory and a physical resource, the computable readable code comprising:

a utility activation routine operational in a computing environment that restricts access to a resource, the utility activation routine being invoked by a request to perform a utility program that attempts to access the resource in a manner that violates the access restriction; and an operating system independent utility execution routine that executes the requested utility program bypassing the restrictions imposed by the computing environment independent of the particular computing environment, the operating system independent utility execution routine including:

a virtual resource reservation routine responsive to the utility activation routine, the virtual resource reservation routine reserving a region of the physical resource as a virtual resource;

an interceptor which is invoked by a virtual resource bootstrap and intercepts a resource access directed to a location on the virtual resource in the reserved region of the native file system and directs the resource access to a corresponding location on the physical resource; and a utility routine operational to generate resource accesses to the virtual resource, so that the resource subject to the access restriction is accessed despite the access restrictions to the resource imposed by the computing environment.

29. A method of operating a computer system having a processor, a memory and a hard disk drive comprising:

activating a utility program operational in a computing environment that restricts access to a resource, the utility program being a program that attempts to access the resource in a manner that violates the access restriction; and executing the activated utility program bypassing the restrictions imposed by the computing environment independent of the particular computing environment including:

reserving a region of the hard disk drive as a virtual resource;

intercepting a resource access directed to a location on the virtual resource and directing the resource access to a corresponding location on the hard disk drive; and generating resource accesses to the virtual resource via the utility routine so that the resource subject to the access restriction is accessed despite the access restrictions to the resource imposed by the computing environment.

30. A computer program product comprising:

a computer usable medium having computable readable code embodied therein implementing the method according to claim 27.

31. A computer system comprising:

a processor;

a memory coupled to the processor, the memory including a computable readable code embodied therein implementing the method according to claim 29.

32. A computer system for building an operating system-independent environment for executing utility programs comprising:

a processor;

a memory coupled to the processor;

a hard disk drive coupled to the processor;

a native operating system controlling the processor and controlling accessing of the memory and hard disk drive by the processor, control of accessing of the memory and the hard disk drive including prohibiting access;

a native file system defined in accordance with the native operating system;

a utility program operational in the native operating system that controls access to the memory and the hard disk drive, the utility program being a program that attempts to access the memory and hard disk drive contrary to the prohibition of access imposed by the native operating system; and a routine for establishing a virtual drive within the native file system, the utility program generating resource accesses to the virtual drive so that the restricted-access resource is accessed bypassing the access restrictions to the resource imposed by the native operating system independent of the particular native operating system.

33. A method of operating a computer system having a processor, a memory and a hard disk drive comprising:

establishing a native file system in accordance with a native operating system that restricts access to a resource;

activating a utility program operational in the native operating system, the utility program being a program that attempts to access the resource in a manner that violates the access restrictions imposed by the native operating system; and executing the activated utility program bypassing the restrictions imposed by the computing environment independent of the particular computing environment including:

establishing a virtual drive within the native file system, the utility program generating resource accesses to the virtual drive so that the resource subject to the access restriction is accessed despite the access restrictions to the resource imposed by the native operating system.

34. A computer program product comprising:

a computer usable medium having computable readable code embodied therein implementing the method according to claim 33.

35. A computer system comprising:

a processor;

a memory coupled to the processor, the memory including a computable readable code embodied therein implementing the method according to claim 33.

* * * * *